US011488057B1

(12) United States Patent
Sutter et al.

(10) Patent No.: US 11,488,057 B1
(45) Date of Patent: *Nov. 1, 2022

(54) USING PROXY BEHAVIORS FOR AUDIENCE SELECTION

(71) Applicant: Quantcast Corporation, San Francisco, CA (US)

(72) Inventors: Paul G. Sutter, Seattle, WA (US); Konrad S. Feldman, San Francisco, CA (US)

(73) Assignee: Quantcast Corporation, San Francisco, CA (US)

( * ) Notice: Subject to any disclaimer, the term of this patent is extended or adjusted under 35 U.S.C. 154(b) by 933 days.

This patent is subject to a terminal disclaimer.

(21) Appl. No.: 16/272,981

(22) Filed: Feb. 11, 2019

Related U.S. Application Data

(63) Continuation of application No. 14/838,539, filed on Aug. 28, 2015, now Pat. No. 10,204,306, which is a
(Continued)

(51) Int. Cl.
*G06N 20/00* (2019.01)
*G06F 16/9535* (2019.01)
(Continued)

(52) U.S. Cl.
CPC ........... *G06N 20/00* (2019.01); *G06F 16/951* (2019.01); *G06F 16/9535* (2019.01);
(Continued)

(58) Field of Classification Search
CPC ...... G06N 99/00; G06N 5/003; G06N 99/005; G06N 20/00; G06Q 30/00; G06Q 30/0255;
(Continued)

(56) References Cited

U.S. PATENT DOCUMENTS 6,839,680 B1   1/2005   Liu et al.
7,685,191 B1 * 3/2010   Zwicky et al. ............... 707/706
(Continued)

OTHER PUBLICATIONS

Deng J. et al., "Local Web Advertisement Through Dynamic Active Proxy", IEEE ICME, 2000, pp. 1183-1186. (Previously supplied). (Year: 2000).*

(Continued)

*Primary Examiner* — Dave Misir
(74) *Attorney, Agent, or Firm* — Andrea Wheeler

(57) ABSTRACT

Method and system for assessing the suitability of an entity using a proxy. A description of a behavior associated with a desirable audience is received. A proxy behavior estimated to be characteristic of the desirable audience is selected. The proxy behavior comprises the performance of proxy events related to the consumption of media received by an entity over a network, which can be found in an entity's consumption history. An entity can be assessed for inclusion in a proxy audience, by examining the entity's consumption history for proxy behaviors. A behavioral model is built using a training set comprising the proxy audience. By applying the behavioral model to the consumption history of a specified entity, the specified entity's suitability for selection can be determined. Advantageously, in an embodiment, the invention enables the use of behavioral modeling techniques even when the complete behavior of the desirable audience is not available.

27 Claims, 3 Drawing Sheets

Related U.S. Application Data continuation of application No. 14/230,614, filed on Mar. 31, 2014, now Pat. No. 9,183,568, which is a continuation of application No. 13/275,098, filed on Oct. 17, 2011, now Pat. No. 8,751,418.

(51) Int. Cl.
*G06Q 30/02* (2012.01)
*G06N 5/00* (2006.01)
*G06F 16/951* (2019.01)

(52) U.S. Cl.
CPC ......... *G06N 5/003* (2013.01); *G06Q 30/0255* (2013.01); *G06Q 30/0277* (2013.01)

(58) Field of Classification Search
CPC .......... G06Q 30/0277; G06F 17/30867; G06F 17/30864; G06F 16/9535; G06F 16/951
USPC ........................................................ 706/12
See application file for complete search history.

(56) References Cited

U.S. PATENT DOCUMENTS

| | | | |
|---|---|---|---|
| 8,438,170 B2* | 5/2013 | Koran et al. | 707/748 |
| 8,448,057 B1* | 5/2013 | Sugnet et al. | 715/204 |
| 8,504,575 B2* | 8/2013 | Koran et al. | 707/748 |
| 2001/0020236 A1* | 9/2001 | Cannon | 707/1 |
| 2002/0013757 A1 | 1/2002 | Bykowsky et al. | |
| 2003/0084452 A1 | 5/2003 | Ryan et al. | |
| 2003/0101451 A1* | 5/2003 | Bentolila et al. | 725/34 |
| 2003/0171990 A1* | 9/2003 | Rao et al. | 705/14 |
| 2003/0187741 A1* | 10/2003 | Brown et al. | 705/14 |
| 2004/0181554 A1 | 9/2004 | Heckerman et al. | |
| 2004/0194128 A1* | 9/2004 | McIntyre et al. | 725/32 |
| 2005/0246231 A1* | 11/2005 | Shkedi | 705/14 |
| 2006/0026063 A1 | 2/2006 | Collins | |
| 2006/0069616 A1* | 3/2006 | Bau | 705/14 |
| 2006/0173828 A1 | 8/2006 | Rosenberg | |
| 2006/0282328 A1* | 12/2006 | Gerace et al. | 705/14 |
| 2007/0061211 A1* | 3/2007 | Ramer et al. | 705/25 |
| 2007/0100803 A1* | 5/2007 | Cava | 707/3 |
| 2007/0150348 A1* | 6/2007 | Hussain et al. | 705/14 |
| 2007/0239528 A1* | 10/2007 | Xie et al. | 705/14 |
| 2008/0077494 A1* | 3/2008 | Ozveren et al. | 705/14 |
| 2008/0086741 A1* | 4/2008 | Feldman et al. | 725/13 |
| 2008/0222283 A1* | 9/2008 | Ertugrul et al. | 709/224 |
| 2008/0242279 A1* | 10/2008 | Ramer et al. | 455/414.2 |
| 2009/0024554 A1* | 1/2009 | Murdock et al. | 706/48 |
| 2011/0295687 A1* | 12/2011 | Bilenko et al. | 705/14.54 |

OTHER PUBLICATIONS

Animesh A. et al., "Online Advertisers' Bidding Strategies for Search, Experience, and Credence Goods: An Empirical Investigation", ACM Electronic Commerce, 2005. (Previously supplied). (Year: 2005).*

Matthijs, "Personalizing Web Search using Long Term Browsing History", WSDM'11, Feb. 9-12, 2011, Hong Kong, China. (Year: 2011).*

Animesh A. et al., "Online Advertisers' Bidding Strategies for Search, Experience, and Credence Goods: an Empirical Investigation", ACM Electronic Commerce, 2005.

Archive of "Alexa Web Search—About Alexa," www.alexa.com, Alexa, 24 pages, [Online] [Archived by http://archive.org on Jan. 26, 2005; Retrieved on May 12, 2010] Retrieved from the Internet<URL:http://web.archive.org/web/20050126045240/pages.alexa.com- -company/index.html>.

Deng J. et al., "Local Web Advertisement Through Dynamic Active Proxy", IEEE ICME, 2000, pp. 1183-1186.

PCT International Search Report and Written Opinion, PCT Application No. PCT/US07/80858, dated Feb. 4, 2008, 9 pages.

United States Office Action, U.S. Appl. No. 13/275,098, dated Aug. 23, 2013, 16 pages.

United States Office Action, U.S. Appl. No. 14/230,614, dated Jun. 5, 2015, 7 pages.

United States Office Action, U.S. Appl. No. 14/838,539, dated Feb. 6, 2018, eight pages.

* cited by examiner

USING PROXY BEHAVIORS FOR AUDIENCE SELECTION

CROSS-REFERENCE TO RELATED APPLICATIONS

This application is a continuation of U.S. Non-Provisional application Ser. No. 14/838,539 entitled "Using Proxy Behaviors for Audience Selection" by Paul G. Sutter and Konrad S. Feldman, filed on Aug. 28, 2015, which is a continuation of U.S. Non-Provisional application Ser. No. 14/230,614 entitled "Using Proxy Behaviors for Audience Selection" by Paul G. Sutter and Konrad S. Feldman, filed on Mar. 31, 2014, now U.S. Pat. No. 9,183,568 issued on Nov. 10, 2015, which is a continuation of U.S. Non-Provisional application Ser. No. 13/275,098 entitled "Using Proxy Behaviors for Audience Selection" by Paul G. Sutter and Konrad S. Feldman, filed on Oct. 17, 2011, now U.S. Pat. No. 8,751,418 issued on Jun. 10, 2014, all of which are hereby incorporated by reference in their entirety.

FIELD OF INVENTION

The invention relates to selecting entities to receive online advertising.

BACKGROUND

Information collected during Internet browsing has traditionally been used to select entities for the delivery of online advertising and/or customized content. For example, a direct measurement system can collect information associated with entities such as individual Internet browser installations used to browse the Internet. When an entity requests content from a content provider over a network, such as a request from a web browser operating on a personal computer to display the content of a web page of an online publisher, the content provider can re-direct the entity to submit a request such as a pixel request to the direct measurement system. For example, the content provider can tell the entity that the entire content is not available at the content provider and direct the entity to retrieve the missing portion of the content from another resource, such as the direct measurement system. A pixel request refers to the case where the missing portion of the content is a pixel. In some cases, the missing portion can be a single, invisible pixel. Based on a request such as a pixel request, and optional subsequent actions and/or interactions, the direct measurement system can collect and/or receive information from the entity and/or information associated with the entity. This is an example of a way to collect a consumption history, describing the consumption of media received by an entity over a network, per entity.

An entity can be selected for the delivery of online advertising and/or customized content based on the contents of an entity's consumption history. In some cases, behavioral models for an audience segment of interest can be developed based on the consumption histories of entities in the audience segment. Subsequently, an entity's suitability for selection can be assessed by applying the behavioral model to the entity's consumption history. However, in some cases, content providers may not elect to integrate with a direct measurement system. For example, a content provider such as an online vendor may not want to share information related to consumption events on their websites for privacy reasons. In other cases, content providers may balk at the requirements for integration. In some examples, consumption events associated with un-integrated content providers are not included in the consumption histories collected by the direct measurement system. In other examples, consumption events may be unavailable or unusable by a direct measurement system for a variety of reasons. As a result, these unavailable consumption events cannot be used directly for defining the audience segment of interest. Furthermore, the unavailable consumption events cannot be included in subsequent behavioral modeling based on the consumption histories collected by the direct measurement system.

What is needed is a way to create a behavioral model that can be used to assess the suitability of entities for the delivery of online advertising and/or customized content based on behaviors, such as consumption events, which are not available in a consumption history.

SUMMARY

Embodiments of the invention provide a system, method, and computer-readable medium for assessing the suitability of an entity for the delivery of advertising. In an example, consumption histories for multiple entities are received at a data repository. A description of a behavior associated with a desirable audience is received at the system. A proxy behavior which is estimated to be characteristic of the desirable audience is selected. The proxy behavior comprises the performance of one or more proxy events related to the consumption of media received by an entity over a network, which can be found in an entity's consumption history. An entity can be assessed for inclusion in a proxy audience, which approximates the desirable audience, by examining the entity's consumption history for the proxy behaviors. A behavioral model is built using a training set comprising the proxy audience. The suitability of a specified entity for selection can be determined by applying the behavioral model to the specified entity's consumption history. By applying the behavioral model to the consumption history of a specified entity, the consumption history of the specified entity can be analyzed to determine the specified entity's suitability for selection. Advantageously, in an embodiment, the invention enables the selection of entities using a behavioral model even when the complete behavior of the desirable audience is not available in the data repository. Advantageously, the invention can be operated when the consumption histories in the storage and/or the consumption history of the specified entity lack a comprehensive record of the execution of important consumption events which contribute to the desirability of the desirable audience.

DETAILED DESCRIPTION OF THE INVENTION

Figure 1:
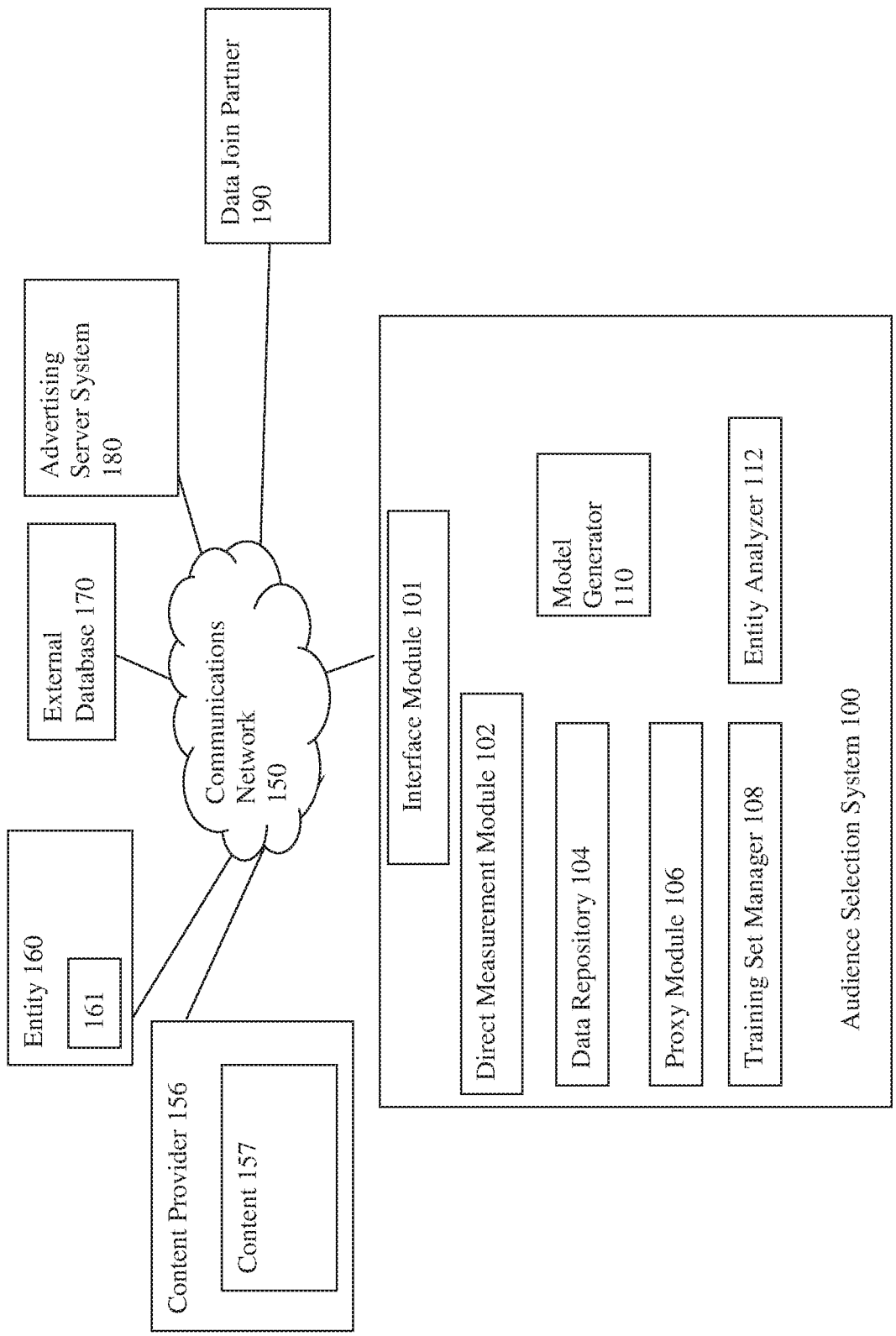
FIG. 1 illustrates an example computing environment in accordance with an embodiment.

FIG. 1 illustrates an example computing environment in accordance with an embodiment. As shown in FIG. 1, the computing environment includes an audience selection system 100, at least one content provider 156, at least one entity 160, an external database 170, an advertising server system 180, and a data join partner 190. These elements are connected by a communications network 150, such as a local area network, a wide area network, a wireless network, an intranet, a cable network, a satellite network, a cellular phone network, an optical network, the Internet or combinations thereof.

Content provider 156 is a media channel which provides content 157 over the communications network 150 to an entity 160. Examples of content providers 156 can include web site operators and cable television operators. In some cases, it can be useful to consider a content provider as comprising multiple content providers. For example, a content provider such as a portal website operator can provide multiple websites, such as localized versions of the same website. Examples of content 157 can include, but are not limited to, a webpage, a portion of an online video clip, a portion of a networked television program, a portion of a cable television program, a portion of a satellite television program, a portion of an Internet Protocol (IP) television program, a portion of an online audio clip, the results of a keyword search from an online search engine, the results of a request for directions from an online mapping service, advertising content and interfaces for making online purchases. In some examples, content 157 can be provided over the communications network 150, based on a request to content provider 156; in some examples, content provider 156 can push the content 157 over the communications network 150 to an entity 160. Although only one content provider 156 is shown in FIG. 1 for clarity, any number of content providers may be connected to the communications network 150.

In various embodiments, entity 160 accesses content 157 from content provider 156 over the communications network 150. Examples of entities can include consumers, software installations or hardware devices used to access content or combinations thereof. A consumer is a person or group of people who access content. Software installations can include a web browser instance, video viewer instance or set-top box software residing on a hardware device. A hardware device can comprise a computer, personal digital assistant (PDA), cell phone or set-top unit (STU) such as a STU used in conjunction with cable television service. In some cases, an entity 160 can comprise a combination of entities which are logically grouped together to represent individuals, households or groups of individuals who access content 157 over a communications network 150. In some cases, an entity which receives content 157, such as a web page, from a content provider 156, such as a website, can also be called a visitor to content provider 156. Although only one entity 160 is shown in FIG. 1 for clarity, any number of entities may be connected to the communications network 150.

As shown in the embodiment of FIG. 1, entity 160 contains identifier 161. Identifier 161 can be used to identify the entity 160. For example, a hardware device identifier such as a Media Access Control Address (MAC address) can be stored on a device associated with the entity 160. A software identifier such as a cookie value can be stored locally. In another embodiment, identifiers used to identify entities can be composed and/or stored remotely from an entity.

In an embodiment, the audience selection system 100 includes an interface module 101, a direct measurement module 102, a data repository 104, a proxy module 106, a training set manager 108, a model generator 110 and an entity analyzer 112. Those of skill in the art will recognize that other embodiments of the audience selection system 100 can include additional and/or different modules than the ones shown in FIG. 1. Moreover, the functionalities can be distributed among the modules in a different manner than described here.

In an embodiment, interface module 101 can receive and transmit information over a communications network 150. Interface module 101 enables audience selection system 100 to send and/or receive information from external systems such as content provider 156, entity 160, external database 170, advertising server system 180 and/or data join partner 190. For example, in some cases, an interface module 101 can receive information such as data, data requests and/or configurations submitted to the audience selection system 100 from a local and/or remote system through a programmatic interface and/or a user interface.

In an embodiment, direct measurement module 102 collects and/or receives information for an entity 160 in conjunction with an identifier such as identifier 161. When an entity 160 requests content, such as content 157, from a content provider 156, such as a request from a web browser operating on a personal computer to display the content of a web page of an online publisher, the content provider 156 can re-direct the entity 160 to submit a pixel request to the direct measurement module 102. Based on the pixel request, and optional subsequent actions and/or interactions, the direct measurement module 102 can collect and/or receive information from the entity 160 and/or information associated with the entity 160. Information is collected and/or received in conjunction with an identifier, such as identifier 161, in order to enable the maintenance of a coherent body of information, such as consumption history, a portion of a consumption history, a consumption history score, a consumption history characterization and/or a consumption history digest, for an entity over time.

Information can include a consumption history for an entity 160, such as records of the execution of consumption events and attribute values. In some cases, the context of a consumption event, such as the duration and/or quality of the consumption event, can be part of the consumption history. In an example, information associated with the hardware and/or software configuration and/or volume settings during the delivery of an audio advertisement can be collected and stored as part of the consumption history. In some cases, the consumption history associated with an entity 160 can be associated with actions and/or interactions with the content, such as pausing an online video clip.

Attribute values can comprise known, collected, received, cross-referenced, inferred, estimated, processed and/or calculated information related to an entity 160 which is not part of a consumption history. However, in some cases, attribute values can be derived from a consumption history. The estimated household size associated with an entity 160 and the average household income for the zip code associated with an entity 160 are examples of attribute values. In some cases, attribute values can be assessed or described using probabilities. For example, an attribute value can reflect that there is a 90% chance that the household income for a family group owning an entity earns between $75,000 and $100,000 per year. In some cases, information can be received and processed into a processed attribute value. For example, attribute values can comprise information which has been statistically obfuscated to address privacy concerns.

In an embodiment, information collected and/or received by the direct measurement module 102 is stored in a data repository 104, such as a database. In some cases, information collected and/or received by the direct measurement module 102 can be processed before it is stored in data repository 104.

In an example, portions of a consumption history, such as records related to some consumption events, may not be usable or accessible by the audience selection system 100. For example, the kinds of data which can be retained can be defined according to the laws of a jurisdiction of importance such as the State of California, the United States or the European Union. In some cases, the retention period for consumption histories and/or other kinds of data can be defined and/or regulated according to the laws of a jurisdiction of importance. For a variety of reasons, a consumption history, or portions thereof, which are stored in the data repository 104 can be partially or wholly deleted, purged and/or anonymized based on their contents and/or the time considerations, making affected consumption events unusable or inaccessible for use in selecting and/or assessing their associated entities 160 from the audience selection system 100.

Records associated with some consumption events may not be accessible by the audience selection system 100. For example, not all consumption events are collected by the direct measurement module 102 and/or stored in data repository 104. For example, a content provider 156, such as a website for an automobile manufacturer, may provide content 157 such as the specifications for their newest model car over a communications network 150. The automobile manufacturer may not want to enable a third party resource, such as a direct measurement system or direct measurement module 102, to track media content consumption on their website. In this example, a direct measurement module 102 may not be able to collect or receive consumption events associated with the behavior of downloading the specifications for the newest model car from the automobile manufacturer.

Proxy module 106 receives focus information which is descriptive of a desirable audience, such as a description of a behavior characteristic of a desirable audience. The proxy module maps the focus information to a proxy behavior which is estimated to be characteristic of the desirable audience. The proxy behavior describes a behavior comprising one or more proxy consumption events which can be identified in the data repository or accessed from other systems such as external database 170 or data join partner 190.

For example, an advertising campaign manager may manage a campaign to deliver online advertising over a communications network 150 focusing on a particular, desirable audience. Focus information can comprise the advertising campaign manager's description of a desirable behavior which includes interaction with a desirable content provider involving desirable content provided over a communications network. For example, an advertising campaign manager running a campaign to sell a new model car may describe the desirable behavior of a desirable audience by noting that entities which have downloaded the specification for the new model car over the Internet from the manufacturer's website are very interested car buyers. These very interested car buyers comprise the desirable audience. In this example, the desirable behavior is "downloaded a specification for the new model car from the manufacturer's web site over the Internet"; the desirable audience is the set of entities which have executed the desirable behavior; and, the desirable content is the specification and the desirable content provider is the manufacturer's website. Ideally, an advertising campaign manager may want to reach the desirable audience and/or entities which may not have downloaded the specifications, but which have other behaviors similar to the desirable audience.

A proxy behavior approximates one or more behaviors shared by entities in a desirable audience. In an example, a proxy behavior describes the execution of one or more consumption events. The use of proxy behaviors can be especially important when one or more of the desirable behaviors shared by the entities in the desirable audience are unavailable in the data repository. In this example, the desirable behavior shared by entities in the desirable audience is "downloaded a specification for the new model car from the manufacturer's web site over the Internet". However, because the car manufacturer did not integrate their website with the direct measurement module 102, there is no consumption event that represents this exact behavior stored in the data repository 104. To identify an audience which approximates the desirable audience in the data repository, a different behavior, such as a proxy behavior which is recorded in the data repository can be used. In an embodiment, an advertising campaign manager can submit focus information related to a campaign, such as a description of a desirable behavior which characterizes the desirable audience, to an audience selection system 100 in a variety of ways, such as through a messaging system and/or user interface using free text. In another example, an advertising campaign manager may submit focus information to the audience selection system 100 by operating a user interface with pre-designated selections such as a drop down menu or set of check boxes.

In an example, an advertising campaign manager may provide the audience selection system 100 with focus information comprising a set of referral keywords, such as the keywords which were used by an entity operating a search engine to locate the desirable content. In some examples, the referral keywords may be keywords which were used in conjunction with a site-wide search engine and/or an Internet-wide search engine. In an example, an advertising campaign manager may provide the audience selection system 100 with a set of keywords which have been used in successful search engine advertising campaigns in the past. Furthermore, the keywords may be accompanied by weights which may be used to indicate their relative importance to the advertising campaign manager. For example, the weights may represent the maximum bid prices offered in a search engine advertising campaign.

In some cases, the proxy module 106 can receive focus information comprising a set of keywords and map them into one or more proxy consumption events which may be found in data repository 104. In an example, proxy module 106 can receive keywords A, B and C and map them into the following list of proxy consumption events which may be found in data repository 104:

Searched on A, B or C using search engine 1 within the last 6 months.

Searched on A, B or C using search engine 2 within the last 6 months.

Searched on A, B or C using search engine 3 within the last 6 months.

In another example, proxy module 106 can receive focus information such as keywords A, B and C and expand them to a new, more comprehensive list such as: A, A', A'', B, B', B'', C, C', C'' and then map the comprehensive list to the following list of proxy consumption events:

Searched on A, A', A'', B, B', B'', C, C' or C'' using search engine 1 within the last 6 months.

Searched on A, A', A", B, B', B", C, C' or C" using search engine 2 within the last 6 months.

Searched on A, A', A", B, B', B", C, C' or C" using search engine 3 within the last 6 months.

In another example, proxy module 106 can receive focus information such as a description of a behavior of a desirable audience and/or a hint comprising keywords such as positive keywords and/or negative keywords. For example, an online stock broker may want to select entities which have used their online stock portfolio balancing tool without integrating their online tool suite with direct measurement module 102. The online stock broker may submit focus information to the audience selection system 100 comprising positive keywords such as "stock planning tool, stock market, balance portfolio" and negative keywords such as "farm, bovine, feed" in order to focus on entities interested in the financial stock market for buying and selling shares of stock and exclude entities interested in the agricultural stock market for raising, buying and selling live animals. In this example, proxy module 106 can receive positive and negative keywords and map them into the following list of positive and negative proxy consumption events which may be found in data repository 104:

Searched on "stock planning tool, stock market or balance portfolio" using search engines 1, 2 or 3 within the last 6 months.

Did not search on "farm, bovine or feed" using search engines 1, 2 or 3 within the last 6 months.

Focus information can comprise multiple proxy consumption events, which can be weighted to emphasize or de-emphasize the importance of the proxy consumption event. For example, a marketing campaign operator can submit one or more keywords and associated weights indicating how the elements should be emphasized and/or de-emphasized when selecting a training set of entities. The audience selection system 100 can then use the keywords and weights, creating a weighted proxy behavior. For example, the proxy module 106 can assign weights assigned per proxy consumption event or set of proxy consumption events. In an example, the impact of an entity in a training set on a behavioral model can be increased or decreased based on the presence or absence of the weighted proxy consumption event or set of weighted proxy consumption events.

In an example, weights can be assigned to proxy consumption events associated with keyword searches based on a marketer's bid parameters for a portion of a keyword search string. For example, the weights per keyword can reflect the configured maximum bid per keyword. In this example, a marketer can translate the marketing knowledge embedded in their keyword bid parameter configuration to a campaign operated in conjunction with the audience selection system 100.

In an example, weighted proxy behavior can describe assigning weights to one or more proxy consumption events based on the presence and/or absence of a consumption event in an entity's consumption history. In some cases, weighted proxy behavior can describe assigning weights to one or more proxy consumption events based on the frequency and/or recency of one or more consumption events.

Proxy module 106 receives the focus information, including a description of a behavior of a desirable audience. The proxy module 106, maps the behavior to a set of proxy consumption events which can be used to identify entities in the data repository 104 or accessed from other systems. The proxy module 106 provides the training set manager 108 with information enabling the training set manager 108 to query the data repository 104 and identify a set of entities based on the proxy consumption events.

In an example, proxy module 106 may receive a desirable behavior such as "downloaded a specification for the new model car from the manufacturer's website over the Internet", which is not found in the data repository 104 and map that to one or more proxy consumption events such as: "executed a search using a search engine with two or more search terms selected from the list including 'car model name', 'car manufacturer name', 'car specifications', 'buy car online', 'car safety ratings', 'best gas mileage'.

In an example, the proxy module 106 may receive other focus information to help it generate the mapping. In an example, focus information such as the hint "tends to work for a Fortune 500 company" may be mapped to a proxy consumption event representing "any content accessed from a Fortune 500 workplace". An example of a proxy event representing browsing from a Fortune 500 workplace could be described as "an event where the entity requested content from a content provider over the Internet where the entity's domain is selected from the list of Fortune 500 domains".

In an example, proxy consumption events can comprise individual events or compound events. An example of a proxy consumption event including compound events is:

Executed at least 30 consumption events of any kind in the last week; and, used a search engine with the following keyword string: "highest safety rating for minivans", followed by one or more of the following events:

visited online car broker's website, visited website for large car dealer, used online mapping website to map a car dealer's address.

In this example, the compound events are also sequenced in time. However, in some cases, the compound events are not sequenced in time.

In an example, proxy consumption events can be used to approximate behaviors which are desirable and/or behaviors which are undesirable. An example of a desirable behavior for a San Jose based vendor may be "viewed an online weather forecast for San Jose". An example of an undesirable behavior may be "made less than three online purchases in the past year".

Training set manager 108 receives a set of proxy consumption events and uses them to select a training set. A training set is used to fit a behavioral model and can include a positive training set and a negative training set. For example, a training set manager 108 can receive a list of proxy consumption events and select a positive training set of entities by selecting entities with one or more of the proxy consumption events from the list in their consumption history. In some cases, the absence of a proxy consumption event can be used to select the positive training set. For example, the positive training set can comprise entities which have searched on "stock planning tool, stock market or balance portfolio" but did not search on "farm, bovine or feed" using search engines 1, 2 or 3 within the last 6 months.

A negative training set of entities can be selected using proxy consumption events. For example, a negative training set can be selected by selecting entities which do not have the positive consumption events in their consumption history. In an example, a set of proxy consumption events can be received and used to select a negative training set of entities from the data repository 104 based on the presence and/or absence of the consumption events in the consumption histories of the entities.

Training set manager 108 can receive weights associated with proxy consumption events from the proxy module 106.

In some cases, the weights can be used to select entities for inclusion in the training set. In some cases, the weights can be used to emphasize and/or de-emphasize the impact of entities in the training set. For example, the consumption histories of the entities in the training set can be analyzed to determine which entities should be weighted, and if so, by how much. In an example, an entity which should be given twice the weight of a regular entity may be counted twice in the training set for the purposes of modeling or duplicated in the training set, to provide a double weight to the entity.

Model generator 110 generates models using training sets received from the training set manager 108. For example, model generator 110 can use the one or more training sets provided by training set manager 108 to create a behavioral model which can be used to assess the suitability of an entity based on the consumption history of that entity. For example, supervised learning models can be used to model the important differences between a positive training set and a negative training set. Conformity to the model can be assessed per entity by examining the consumption history of the entity. In this example, a specified entity can be analyzed by applying the behavioral model to the consumption history of the specified entity, with the conformity to the model used to indicate the suitability of the entity. The entity can be selected for subsequent actions based on its suitability.

In an example, model generator 110 can generate a model based on audience commonality metrics. An audience commonality metric characterizes overlap in audiences between sets of channels, or content providers, based on identified visitor entities. In an example, the audience commonality metric characterizes the overlap in audience between sets of content providers compared to the expected overlap, based on statistics. For example, the expected audience for an individual content provider or set of content providers can be estimated using historical data. For example, for a given time period, if the audience for a first website was 10% of a standard audience such as the US Internet audience, then we would expect an overlap where 10% of the audience of the second website is also part of the audience of the first website. If the audience overlap is greater than expected, then we say that there is an affinity between the two websites; a visitor to the first website is more likely than the typical US Internet audience member to also be a visitor to the second website. If the audience overlap is less than expected, then we say that there is a negative affinity between the two website; a visitor to the first website is less likely than the typical US Internet audience member to also be a visitor to the second website. In other examples, the expected overlap can be based on network traffic measurements, census information or other internal and/or external measurements or estimates. In some cases, the expected overlap can be estimated using a variety of different standard audiences such as standard audiences which have been selected based on their consumption history, geographic location, language preference and/or attributes which have been measured, inferred or calculated.

In an example, the audience overlap can be calculated for the proxy audience (or positive training set) between a proxy content provider (representing a proxy event) and a selected media channel, such as a content provider. For example, the fraction of entities in the proxy audience which received content from both the proxy content provider and the selected media channel can represent the proxy audience overlap for the selected media channel. To determine the expected overlap, an audience overlap can be calculated for the negative training set, characterizing the overlap between the proxy content provider and the selected media channel. For example, the fraction of entities in the negative training set which received content from the proxy content provider and also received content from the selected media channel can represent the expected audience overlap. If the proxy audience overlap is greater than the expected audience overlap, that indicates an affinity amongst the proxy audience for the other content provider because an entity in the proxy audience is more likely than an entity in the negative training set to receive content from the other content provider. Conversely, if the proxy audience overlap is less than the expected audience overlap, that indicates a negative affinity amongst the proxy audience for the other content provider because an entity in the proxy audience is less likely than an entity in the negative training set to receive content from the other content provider.

Model generator 110 can calculate audience commonality metrics to identify which content providers have the strongest positive (and/or negative) affinities for the proxy audience. A behavioral model can be built using audience commonality metrics so that entities can be assessed for suitability based on their consumption history, by searching the consumption histories for indications of consumption events associated with content providers with the strongest positive affinities (and/or the absence of consumption events associated with content providers with the strongest negative affinities).

The models created by the model generator 110 can be used to find, analyze and/or score one or more entities based on their consumption history. The model can be applied to one or more entities from a pool of entities in the data repository 104 to select entities based on the differences between a positive training set of entities and a negative training set of entities. For example, a positive training set can comprise entities with the consumption event "purchased a book online using a coupon" in their consumption histories and the negative training set could comprise entities with the consumption event "received the book coupon" but NOT the consumption event "purchased a book online using a coupon". Examples of supervised learning algorithms include Support Vector Machines, Neural Nets, Boosting Algorithms, Generalized Linear Models, Naïve Bayes and/or Decision Trees.

In another example, the model can be applied to one or more entities from a pool of entities in the data repository 104, where the pool represents a general audience, such as the entire Internet, or a more specific audience, such as the US Internet audience.

In another example, a complete or partial consumption history can be received by the audience selection system 100, and the model can be applied to the individual, complete or partial consumption history. In another example, the audience selection system 100 can access one or more complete or partial consumption histories from an external resource and the model can be applied to the one or more complete or partial consumption histories.

Referring back to FIG. 1, the audience selection system 100 also includes an entity analyzer 112. Entity analyzer 112 accesses the model generated by the model generator 110 and applies the model to the consumption history of a specified entity to assess the suitability of the specified entity. In some cases, assessing the suitability of the specified entity can comprise categorizing, scoring and/or rating the entity. In an example, the model can be applied to a comprehensive consumption history stored in the data repository 104. In another example, the audience selection system 100 can receive part or all of a consumption history for an entity and the model can be applied to the partial, received consumption history. For example, the consumption history can comprise information associated with as few as one consumption event.

Advertising server system 180 serves networked advertisements for delivery to entities such as entity 160 in conjunction with content 157 over the communications network 150. For example, an advertising server system can comprise a web server for storing online advertising content and delivering the online advertising content to website visitors through a client device. A local advertising server system may only provide services for a single content provider, whereas third-party advertising server systems can provide services in conjunction with multiple content providers.

As illustrated in FIG. 1, the direct measurement module 102 is disposed inside the audience selection system 100. However, in other embodiments, the direct measurement module can be distributed across multiple systems and/or locations. In some embodiments, the direct measurement module can be partially or wholly external to the audience selection system 100. For example, in some embodiments, a portion of the direct measurement system or the entire direct measurement module may be operated in a domain which is different than the audience selection system. As illustrated in FIG. 1, the data repository 104 is disposed inside the audience selection system 100. However, in other embodiments the data repository can be distributed across multiple systems and/or locations. In some embodiments, the data repository can be partially or wholly external to the audience selection system 100.

Figure 3:
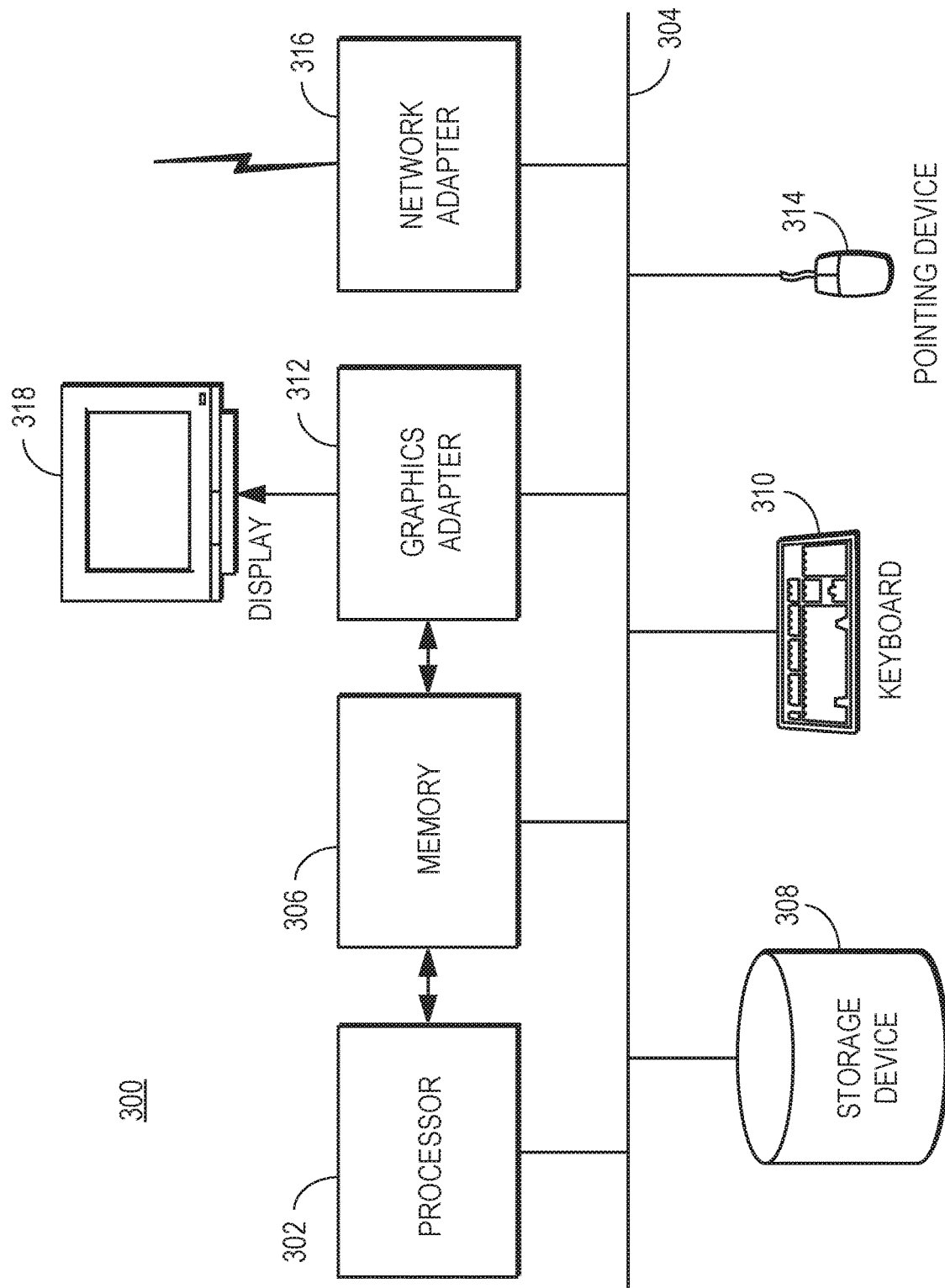
FIG. 3 is a high-level block diagram illustrating an example of a computer for use as an audience selection system, an external database, an advertising server system, a content provider, a client device, and/or a data join partner of FIG. 1.

FIG. 3 is a high-level block diagram illustrating an example of a computer for use as a audience selection system 100, a content provider 156, an entity 160, a data join partner 190, an external database 170 and/or an advertising server system 180 of FIG. 1. Illustrated are a processor 302 coupled to a bus 304. Also coupled to the bus 304 are a memory 306, a storage device 308, a keyboard 310, a graphics adapter 312, a pointing device 314, and a network adapter 316. A display 318 is coupled to the graphics adapter 312.

The processor 302 may be any general-purpose processor. The storage device 308 is, in one embodiment, a hard disk drive but can also be any other device capable of storing data, such as a writeable compact disk (CD) or DVD, or a solid-state memory device. The memory 306 may be, for example, firmware, read-only memory (ROM), non-volatile random access memory (NVRAM), and/or RAM, and holds instructions and data used by the processor 302. The pointing device 314 may be a mouse, track ball, or other type of pointing device, and is used in combination with the keyboard 310 to input data into the computer 300. The graphics adapter 312 displays images and other information on the display 318. The network adapter 316 couples the computer 300 to the communications network (not shown). In one embodiment, the communications network is the Internet. The communications network can also utilize dedicated or private communications links that are not necessarily part of the Internet.

As is known in the art, the computer 300 is adapted to execute computer program modules. As used herein, the term "module" refers to computer program logic and/or data for providing the specified functionality. A module can be implemented in hardware, firmware, and/or software. In one embodiment, the modules are stored on the storage device 308, loaded into the memory 306, and executed by the processor 302. The computer 300 is configured to perform the specific functions and operations by various modules, for example as detailed in FIG. 2, and thereby operates as a particular computer under such program control. The types of computers 300 utilized by the entities of FIG. 1 can vary depending upon the embodiment and the processing power utilized by the entity.

Figure 2:
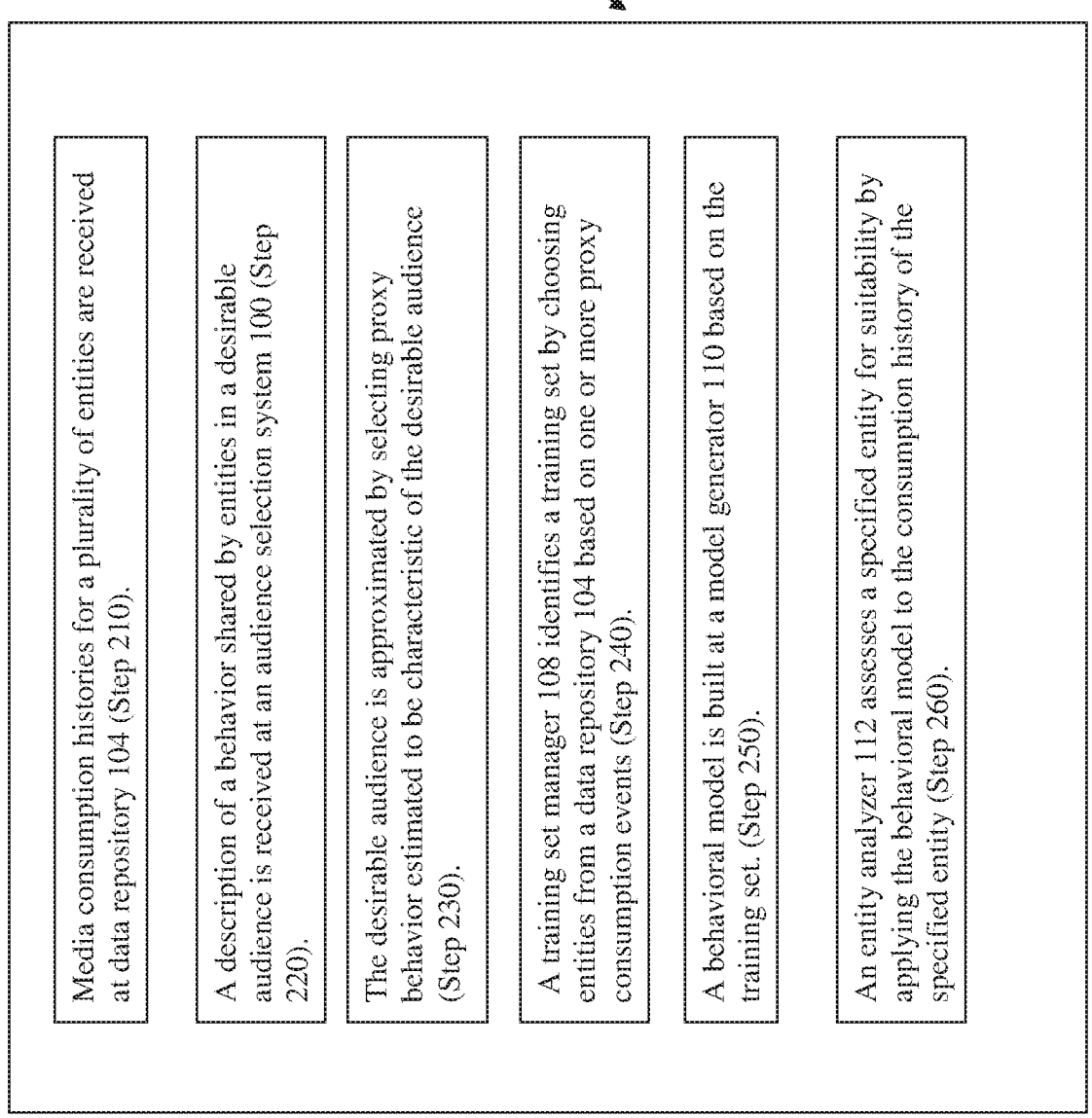
FIG. 2 is a flow chart illustrating an example of a method for assessing the suitability of an entity for selection according to an embodiment.

An embodiment of the invention is a computer-implemented method for assessing the suitability of a specified entity at an audience selection system 100. FIG. 2 is a flow chart illustrating an example of a method for assessing the suitability of a specified entity according to an embodiment. Referring to Step 210, consumption histories for a plurality of entities are received at a data repository 104. In an example, a direct measurement system, such as direct measurement module 102, collects a consumption history. In some examples, a consumption history, or portion thereof, can be received at the data repository from other external and/or internal systems in addition to or instead of accessing the consumption histories from an internal direct measurement system.

Referring to Step 220, a description of a behavior shared by entities in a desirable audience, such as focus information related to an online advertising campaign, is received at an audience selection system 100. For example, focus information can include a set of keywords likely or known to be used to by entities in a desirable audience. In some cases, a behavior can be provided with weights to emphasize some aspects of the behavior. For example, a behavior comprising keywords can include weights which indicate the relative importance of each keyword.

Referring to Step 230, the desirable audience is approximated by selecting proxy behavior estimated to be characteristic of the desirable audience. Proxy behavior comprises the performance of one or more proxy consumption events. These proxy consumption events are subsequently used to select a training set of entities. In some cases, the absence of a consumption event in the consumption history can be used to characterize the positive and/or negative training sets. For example, the proxy behavior can include negative characterizations too, such as the execution of one or more consumption events that are not shared by entities in a desirable audience. For example, if entities in a desirable audience are thought to never or rarely visit a category of websites, then the proxy behavior for that desirable audience can indicate that the consumption event "visited a website in a specified category of websites in the past week" should be selected against when choosing the positive training set.

Referring to Step 240, a training set manager 108 identifies a training set by choosing entities from a data repository 104 based on one or more proxy consumption events. In some cases, a marketer or campaign manager may further prune the training set by adding limitations. For example, the training set can be selected based on the proxy consumption events and then further pruned by excluding entities which have (or don't have) certain attributes. In some cases, the attribute values can be inferred from the consumption history and/or received from the entity 160, an external database 170 and/or a data join partner 190. For example, this can enable a marketer or campaign manager to further refine a training set to exclude entities which are thought to be members of a household with an annual income of less than $50,000. A positive training set and/or a negative training set can be refined in this manner before the behavioral model is built.

Referring to Step 250, a behavioral model is built at a model generator 110 based on the training set. For example, a supervised learning algorithm can be used to fit a positive training set to a behavioral model which can subsequently be used to assess the suitability of an entity. A model can correspond to an advertising campaign and can be used to select entities for the receipt of online advertisements associated with the advertising campaign. In this example, each marketer may be interested in developing multiple models, with each model customized for a specific purpose such as, but not limited to, advertising a specific product and delivering a specific advertisement to a localized market and/or custom market segment.

Referring to Step 260, an entity analyzer 112 assesses a specified entity for suitability by applying the behavioral model to the consumption history of the specified entity. Once an entity is assessed, subsequent commercial actions can be taken such as, but not limited to, selecting, customizing and/or prioritizing an advertisement for delivery to an entity and/or pricing an advertising opportunity associated with the identified entity. In some cases, an embodiment of the invention can be used in conjunction with an intention targeting system. In some cases, multiple entities can be analyzed and the list of entities can be further processed. For example, a list of entities, ordered and/or categorized based on their suitability for specific subsequent actions, can be generated.

The order of the steps in the foregoing described methods of the invention are not intended to limit the invention; the steps may be rearranged.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A computer-implemented method comprising:
   receiving at least one focus keyword search string;
   accessing a respective consumption history of each of a plurality of web browser instances;
   examining the respective consumption history of each of the plurality of web browser instances for at least one proxy event, wherein each proxy event comprises a keyword search corresponding to at least one of the received at least one focus keyword search strings;
   selecting a training set of web browser instances comprising:
      identifying a set of proxy web browser instances from the plurality of web browser instances, each proxy web browser instance having one or more proxy events in each proxy web browser instance's respective consumption history;
      assigning a proxy event weight to each proxy event in each proxy web browser instance's respective consumption history; and
      selecting the training set of web browser instances from the set of proxy web browser instances based on the proxy event weight of the one or more proxy events in each proxy web browser instance's respective consumption history;
   building a behavioral model based on the training set of web browser instances;
   receiving a specified web browser instance's consumption history;
   assessing a suitability of the specified web browser instance for receipt of an advertising content by applying the behavioral model to the specified web browser instance's consumption history; and
   based on a result of the assessing, sending instructions to a content provider to provide the advertising content to the specified web browser instance.

2. The method of claim 1, wherein:
the proxy event weight assigned to each proxy event in each proxy web browser instance's respective consumption history corresponds to a recency of the proxy event in each web browser instance's respective consumption history.

3. The method of claim 1, wherein:
the proxy event weight assigned to each proxy event in each proxy web browser instance's respective consumption history corresponds to a frequency of the proxy event in each web browser instance's respective consumption history.

4. The method of claim 1, wherein:
each focus keyword search string corresponds to a focus parameter, wherein an importance of each focus keyword search string is characterized by the corresponding focus parameter; and
the proxy event weight assigned to each proxy event in each proxy web browser instance's respective consumption history is based on the corresponding focus parameter.

5. The method of claim 4, wherein:
the focus parameter increases the proxy event weight.

6. The method of claim 4, wherein:
the focus parameter decreases the proxy event weight.

7. The method of claim 4, wherein:
the focus parameter comprises a maximum bid.

8. The method of claim 4, wherein the focus parameter is descriptive of a search engine advertising campaign.

9. The method of claim 1 wherein:
receiving at least one focus keyword search string comprises receiving two or more focus keyword search strings.

10. A non-transitory computer readable storage medium including computer program instructions that when executed, cause a computer processor to perform operations comprising:
   receiving at least one focus keyword search string;
   accessing a respective consumption history of each of a plurality of web browser instances;
   examining the respective consumption history of each of the plurality of web browser instances for at least one proxy event, wherein each proxy event comprises a keyword search corresponding to at least one of the received at least one focus keyword search strings;
   selecting a training set of web browser instances comprising:
      identifying a set of proxy web browser instances from the plurality of web browser instances, each proxy web browser instance having one or more proxy events in each proxy web browser instance's respective consumption history;
      assigning a proxy event weight to each proxy event in each proxy web browser instance's respective consumption history; and
      selecting the training set of web browser instances from the set of proxy web browser instances based on the proxy event weight of the one or more proxy events in each proxy web browser instance's respective consumption history;

building a behavioral model based on the training set of web browser instances;

receiving a specified web browser instance's consumption history;

assessing a suitability of the specified web browser instance for receipt of an advertising content by applying the behavioral model to the specified web browser instance's consumption history; and based on a result of the assessing, sending instructions to a content provider to provide the advertising content to the specified web browser instance.

11. The medium of claim 10, wherein:

the proxy event weight assigned to each proxy event in each proxy web browser instance's respective consumption history corresponds to a recency of the proxy event in each web browser instance's respective consumption history.

12. The medium of claim 10, wherein:

the proxy event weight assigned to each proxy event in each proxy web browser instance's respective consumption history corresponds to a frequency of the proxy event in each web browser instance's respective consumption history.

13. The medium of claim 10, wherein:

each focus keyword search string corresponds to a focus parameter, wherein an importance of each focus keyword search string is characterized by the corresponding focus parameter; and the proxy event weight assigned to each proxy event in each proxy web browser instance's respective consumption history is based on the corresponding focus parameter.

14. The medium of claim 13, wherein:
the focus parameter increases the proxy event weight.

15. The medium of claim 13, wherein:
the focus parameter decreases the proxy event weight.

16. The medium of claim 13, wherein:
the focus parameter comprises a maximum bid.

17. The medium of claim 13, wherein the focus parameter is descriptive of a search engine advertising campaign.

18. The medium of claim 10, wherein:
receiving at least one focus keyword search string comprises receiving two or more focus keyword search strings.

19. A system comprising:

a processor; and a non-transitory computer readable storage medium including computer program instructions that when executed, cause a computer processor to perform operations comprising:

receiving at least one focus keyword search string;

accessing a respective consumption history of each of a plurality of web browser instances;

examining the respective consumption history of each of the plurality of web browser instances for at least one proxy event, wherein each proxy event comprises a keyword search corresponding to at least one of the received at least one focus keyword search strings;

selecting a training set of web browser instances comprising:

identifying a set of proxy web browser instances from the plurality of web browser instances, each proxy web browser instance having one or more proxy events in each proxy web browser instance's respective consumption history;

assigning a proxy event weight to each proxy event in each proxy web browser instance's respective consumption history; and selecting the training set of web browser instances from the set of proxy web browser instances based on the proxy event weight of the one or more proxy events in each proxy web browser instance's respective consumption history;

building a behavioral model based on the training set of web browser instances;

receiving a specified web browser instance's consumption history;

assessing a suitability of the specified web browser instance for receipt of an advertising content by applying the behavioral model to the specified web browser instance's consumption history; and based on a result of the assessing, sending instructions to a content provider to provide the advertising content to the specified web browser instance.

20. The system of claim 19, wherein:

the proxy event weight assigned to each proxy event in each proxy web browser instance's respective consumption history corresponds to a recency of the proxy event in each web browser instance's respective consumption history.

21. The system of claim 19, wherein:

proxy event weight assigned to each proxy event in each proxy web browser instance's respective consumption history corresponds to a frequency of the proxy event in each web browser instance's respective consumption history.

22. The system of claim 19, wherein:

each focus keyword search string corresponds to a focus parameter, wherein an importance of each focus keyword search string is characterized by the corresponding focus parameter; and the proxy event weight assigned to each proxy event in each proxy web browser instance's respective consumption history is based on the corresponding focus parameter.

23. The system of claim 22, wherein:
the focus parameter increases the proxy event weight.

24. The system of claim 22, wherein:
the focus parameter decreases the proxy event weight.

25. The system of claim 22, wherein:
the focus parameter comprises a maximum bid.

26. The system of claim 22, wherein the focus parameter is descriptive of a search engine advertising campaign.

27. The system of claim 19, wherein:
receiving at least one focus keyword search string comprises receiving two or more focus keyword search strings.

* * * * *